United States Patent
Noma et al.

(10) Patent No.: US 7,129,820 B2
(45) Date of Patent: Oct. 31, 2006

(54) DOOR STATION APPARATUS WITH ELECTRIC LOCK

(75) Inventors: Koji Noma, Nagoya (JP); Tomohito Abe, Nagoya (JP)

(73) Assignee: Aiphone Co., Ltd., Nagoya (JP)

( * ) Notice: Subject to any disclaimer, the term of this patent is extended or adjusted under 35 U.S.C. 154(b) by 552 days.

(21) Appl. No.: 10/611,058

(22) Filed: Jul. 2, 2003

(65) Prior Publication Data
US 2004/0004536 A1   Jan. 8, 2004

(30) Foreign Application Priority Data
Jul. 5, 2002   (JP)   ............................ 2002-197678

(51) Int. Cl.
*H04M 11/04*   (2006.01)
(52) U.S. Cl. ............................ 340/310.11; 340/538.11; 340/5.1; 379/102.06
(58) Field of Classification Search ................. 340/5.1, 340/5.7, 5.5, 310.16, 310.1; 379/102.06, 379/167.15, 167.07
See application file for complete search history.

(56) References Cited

U.S. PATENT DOCUMENTS

| | | | |
|---|---|---|---|
| 3,978,468 A | * | 8/1976 | Bond et al. ............ 379/102.06 |
| 4,524,384 A | * | 6/1985 | Lefkowitz et al. .......... 348/156 |
| 5,228,078 A | | 7/1993 | Bitzmann |
| 5,475,741 A | * | 12/1995 | Davis et al. ........... 379/102.06 |
| 2002/0030583 A1 | * | 3/2002 | Jang et al. ................. 340/5.53 |

FOREIGN PATENT DOCUMENTS

| | | |
|---|---|---|
| DE | 37 10 091 A | 10/1988 |
| EP | 0 579 345 A | 1/1994 |
| EP | 0 818 914 A | 1/1998 |

* cited by examiner

*Primary Examiner*—Edwin C. Holloway, III
(74) *Attorney, Agent, or Firm*—Birch, Stewart, Kolasch & Birch, LLP

(57) ABSTRACT

The respective sections between a power source unit 4 and a room master station 1, between the room master station 1 and an entrance door station 2, and between the entrance door station 2 and an electric lock 3 are connected by transmission lines of two-wire system 6 for transmitting signals and electric power.

32 Claims, 6 Drawing Sheets

DOOR STATION APPARATUS WITH ELECTRIC LOCK

BACKGROUND OF THE INVENTION

This application claims the benefit of Japanese Application Number 2002-197678 filed Jul. 5, 2002, the entity of which is incorporated herein by reference.

1. Field of the Invention

The present invention relates to a door station apparatus with an electric lock. More particularly, it relates to a door station apparatus with an electric lock, having a room master station which is installed in a room, an entrance door station which serves to call and talk to an inhabitant, an electric lock which is mounted on the door or gate of an entrance, and a power source unit which feeds a supply voltage to the room master station.

2. Description of the Related Art

Figure 6:
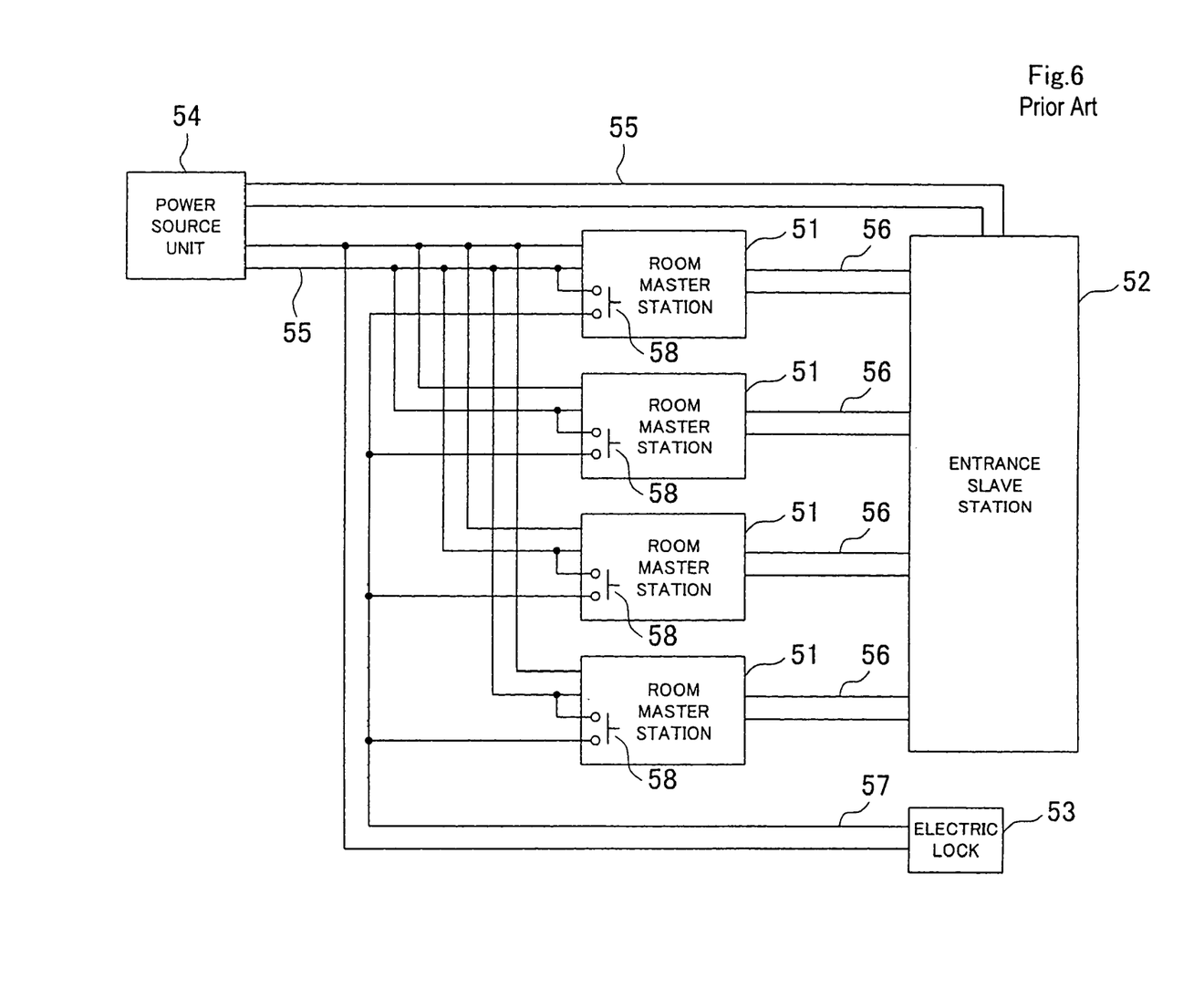
FIG. 6 is a block diagram of a prior-art door station apparatus with an electric lock.

As a prior-art door station apparatus with an electric lock, one having a construction shown in FIG. 6 has been known. The door station apparatus with the electric lock as shown in the block diagram of FIG. 6 is constructed of a plurality of room master stations 51 (in FIG. 6, four stations) which are installed in corresponding rooms so as to talk with a visitor and each of which is furnished with an electric lock button 58 for controlling the electric lock 53, a single entrance door station 52 which is connected to the individual room master stations 51 so as to call and talk with inhabitants, and a power source unit 54 which feeds supply voltages to the room master stations 51 and the electric lock 53 mounted on the door or gate of an entrance. Besides, the individual room master stations 51, and the entrance door station 52 are respectively connected to the power source unit 54 by transmission lines of two-wire system 55, while the individual room master stations 51, and the entrance door station 52 are connected by transmission lines of two-wire system 56 for the talking/calling. Further, the electric lock 53 is connected to the power source unit 54 by a transmission line of two-wire system 57, but one wire of the transmission line 57 is led to the individual room master stations 51.

Here in the door station apparatus with the electric lock, when the visitor calls over the entrance door station 52, buzz is emitted at the called room master station 51 so as to notify the arrival of the visitor to the inhabitant. Subsequently, when the inhabitant answers by taking up a handset, he/she is permitted to talk with the entrance door station 52. Further, when the inhabitant depresses the electric lock button 58 of the room master station 51, the supply voltage is fed from the power source unit 54 to the electric lock 53, and the electric lock 53 is released. In the prior-art door station apparatus with the electric lock, however, the devices are connected to the power source unit 54, and the electric lock 53 is connected to the respective room master stations 51. Therefore, the number of necessary wiring lines is large, and arrangements of the lines are troublesome. Accordingly, the installation of the door station device is troublesome. Especially in case of installing the door station apparatus with an existing house, the installation is difficult due to an insufficient number of wiring lines.

SUMMARY OF THE INVENTION

In view of such problems, the present invention has its object to provide a door station apparatus with an electric lock which can be favorably operated merely by connecting sections between a power source unit and a room master station, between the room master station and an entrance door station, and between the entrance door station and the electric lock with transmission lines of two-wire system.

In order to accomplish the object, a door station apparatus with an electric lock having at least one room master station which is installed in a room in order to talk with a visitor, an entrance door station which is connected with the room master station and which serves to call and talk with an inhabitant, an electric lock which is connected to the entrance door station and which is mounted on a door or gate of an entrance, and a power source unit which feeds a supply voltage to the room master station; is characterized by comprising transmission lines of two-wire system which transmit signals and electric power, and which connect respective sections between said power source unit and said room master station, between said room master station and said entrance door station, and between said entrance door station and said electric lock; an entrance door station side transmitter circuit which is provided in said entrance door station for the purpose of the talk; and a talk/electric lock changeover circuit which is provided in said entrance door station, and which, when an AC voltage for a release operation of said electric lock is applied to the transmission line in the section between said room master station and said entrance door station, detects the AC voltage to separate said entrance door station side transmitter circuit connected to said room master station and to connect said electric lock connected thereto through the transmission line with said room master station; whereby said electric lock connected to said entrance door station is permitted to be manipulated from said room master station through the transmission line.

Owing to this construction, in a state where the entrance door station and the electric lock are connected by the transmission line of two-wire system and where the room master station and the entrance door station are connected by the transmission line of two-wire system, the electric lock can be manipulated from the room master station, so that the room master station and the electric lock need not be directly connected. Moreover, since the electric lock is driven by the AC voltage delivered from the room master station, an operating power source is not separately required. Accordingly, wiring operations are facilitated, all wiring lines can be laid with one sort of transmission lines of two-wire system, and an existing door station apparatus having no electric lock can be easily replaced with one having the electric lock.

The door station apparatus is characterized in that the switching operation of said talk/electric lock changeover circuit is effected by detecting a minus half wave of the AC voltage. Owing to this construction, the talk/electric lock changeover circuit is operated by detecting the minus half wave of the waveform of the AC voltage, so that the switching operation is done instantly and reliably. Besides, since a diode and a capacitor, for example, can be used to form a circuit arrangement for detecting the minus half wave of the AC voltage waveform, the circuit arrangement can be made simply and easily.

The door station apparatus is characterized in that said room master station includes a first voltage supply circuit which generates a DC voltage for performing a standby/call operation between said room master station and said entrance door station, and a second voltage supply circuit which generates a DC voltage for performing a talk operation between said room master station and said entrance door station, and that the voltage generated by said first voltage supply circuit is higher than the voltage generated by said second voltage supply circuit.

Owing to this construction, the higher voltage is set during the call operation, so that the entrance door station side circuits which require the higher voltage can be used.

The door station apparatus is characterized in that said entrance door station includes a talk control circuit which invalidates said entrance door station side transmitter circuit in a case where the voltage from said first voltage supply circuit is applied to the transmission line laid between said room master station and said entrance door station, and which validates said entrance door station side transmitter circuit in a case where the voltage from said second voltage supply circuit for the talk is applied to the transmission line.

In this manner, the supply voltages which are fed to the entrance door station during the standby/call operation and during the talk operation, respectively, are changed, whereby the talk control circuit can be switched and controlled by utilizing the change as a switching signal. Therefore, any switching signal need not be separately generated in order to control the validity/invalidity of the entrance door station side transmitter circuit of the entrance door station, and thus a circuit arrangement can be simplified.

The door station apparatus is characterized in that said room master station includes a call detection circuit which detects a call signal sent from said entrance door station, and a buzz generation circuit which generates a buzz signal; and that said call detection circuit monitors current which flows from said room master station to said entrance door station in a state where the voltage from said first voltage supply circuit is applied to the transmission line in the section between said room master station and said entrance door station, and it feeds a supply voltage to said buzz generation circuit when the current flowing through said transmission line has reached a predetermined value during the call operation of said entrance door station.

A door station apparatus is characterized in that said room master station includes sounding means and has extension sounding means connected thereto, both the sounding means being sounded by the buzz signal generated by said buzz generation circuit, and that the call signal is also sent to said entrance door station so as to emit a call acknowledgment tone from said entrance door station side transmitter circuit included in said entrance door station.

In this manner, the power source current which is fed from the room master station to the entrance door station is changed by the call manipulation of the entrance door station, and the sounding means of the room master station is sounded by detecting the change. Therefore, any call signal need not be separately transmitted through the transmission line from the entrance door station, and a circuit arrangement can be simplified.

Moreover, since the proceeding of the call operation of the room master station can be confirmed at the entrance door station, a sense of relief can be given to the visitor Further, since the extension sounding means is provided, the call of the entrance door station can be reliably recognized in the room.

The door station apparatus is characterized in that said entrance door station includes call buttons for calling the room master stations, and display portions for displaying names etc. of the inhabitants, said call buttons and said display portions being provided in correspondence with said room master stations connected to said entrance door station, and that said display portions are furnished with a display portion illumination circuit which permits recognition of the names etc. even during the nighttime.

Owing to this construction, the entrance door station includes the display portion illumination circuit, so that the visitor can easily recognize the call buttons even in the nighttime.

The door station apparatus is characterized in that said display portion illumination circuit includes backlighting structures in a number corresponding to said display portions, and that each of the individual backlighting structures is lit up by electric power fed from the corresponding room master station.

Owing to this construction, the display portion illumination circuit lights up the backlighting structures by being fed with the electric power from the corresponding individual room master stations, so that power feed means need not be separately provided. Moreover, since the corresponding backlighting structure is not lit up unless the supply voltage is fed to the room master station, the presence of a vacant room is easily recognized when the power fed to the room master station is cut off and the backlighting structure is not lit up.

The door station apparatus is characterized in that said entrance door station includes a connection destination changeover circuit which, when any of said call buttons is depressed, selects said room master station corresponding to the depressed call button and permits the talk with the selected room master station and the electric lock releasing manipulation therefrom. Owing to this construction, the selected room master station is permitted to talk and to perform the electric lock releasing manipulation.

The door station apparatus is characterized in that said room master station includes a buzz volume control circuit which adjusts a buzz volume of said sounding means, and a buzz silence indication circuit which indicates buzz silence setting when said buzz volume control circuit is set at a null buzz volume for preventing said sounding means from operating.

Owing to such a construction, the buzz volume can be adjusted according to the preference of the inhabitant, and forgetting release of the sounding means can be prevented because the buzz silence setting is reported owing to the provision of the buzz silence indication circuit.

BRIEF DESCRIPTION OF THE DRAWINGS

FIGS. 3A, 3B and 3C are waveform diagrams of voltages which are delivered from a room master station to an entrance door station, wherein FIG. 3A shows the DC voltage of 15V, FIG. 3B shows the DC voltage of 6V, and FIG. 3C shows the AC voltage waveform flowing in case of manipulating the electric lock;

PREFERRED EMBODIMENTS OF THE INVENTION

Figure 1:
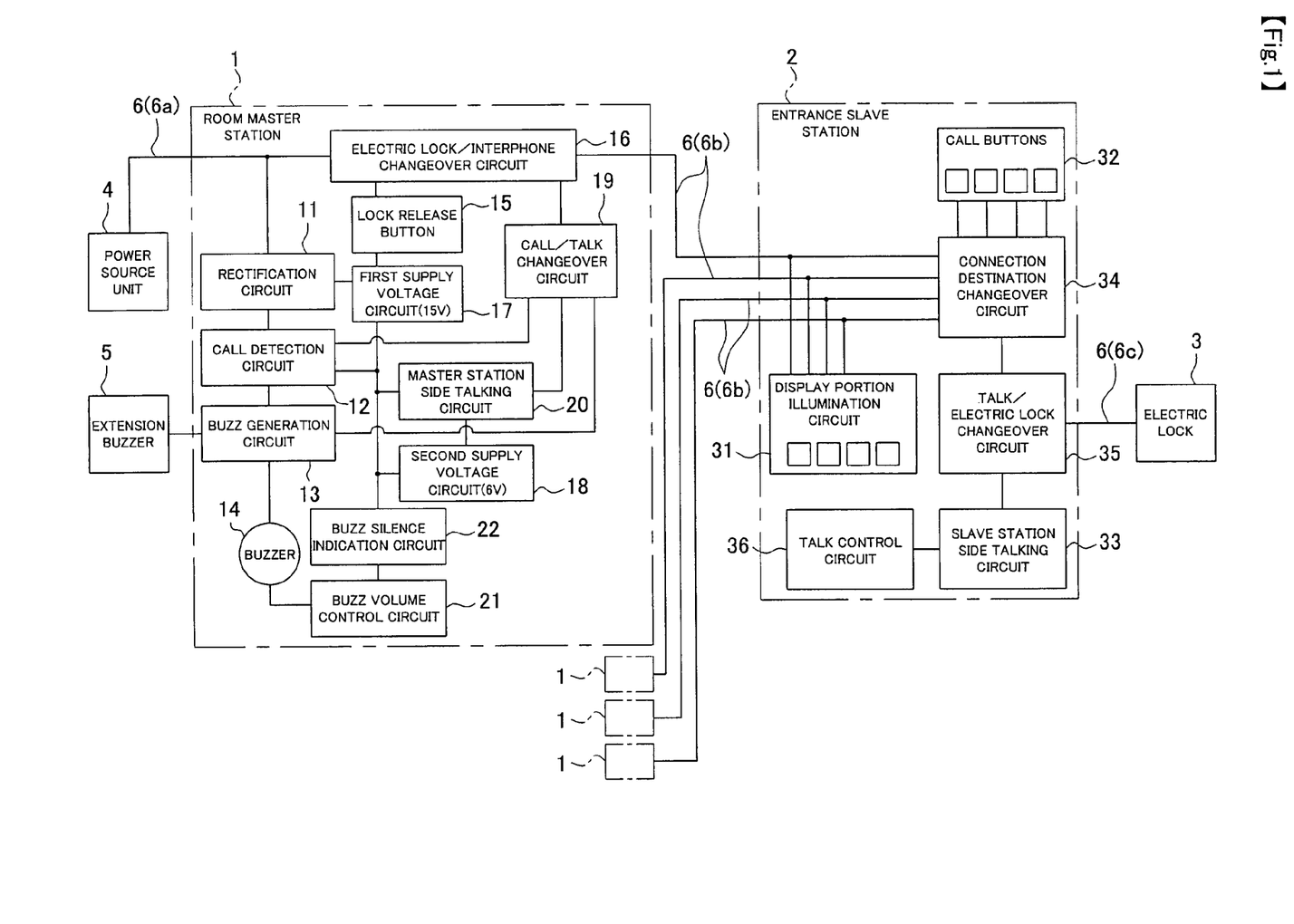
FIG. 1 is a block diagram of a door station apparatus with an electric lock showing an embodiment of the present invention.

Now, the aspects of performance embodying the present invention will be described in detail with reference to the drawings. FIG. 1 is a block diagram showing an embodiment of a door station apparatus with an electric lock according to the present invention. The door station apparatus has room master stations 1 which are installed in corresponding rooms in order to talk with a visitor, an entrance door station 2 which is connected to the room master stations 1 so as to call and talk with inhabitants, the electric lock 3 which is connected to the entrance door station 2 and mounted on the door or gate of an entrance, and a power source unit 4 which feeds a supply voltage to the corresponding room master station 1. Numeral 5 designates an extension buzzer, and the power source unit 4 is provided every room master station 1. FIG. 1 shows a construction including the room master stations 1 in the number of 4, and the internal arrangement of only one room master station is shown because the four stations have the same arrangements.

In addition, all the sections between the room master station 1 and the power source unit 4, between the respective room master stations 1 and the entrance door station 2, and between the entrance door station 2 and the electric lock 3 are connected by transmission lines of two-wire system 6 (6a; 6b, 6b, 6b, 6b; and 6c) which transmit signals and electric power.

The room master station 1 includes a rectification circuit 11 which rectifies AC power fed from the power source unit 4, a call detection circuit 12 which detects a call from the entrance door station 2, a buzz generation circuit 13 which sounds a buzzer 14 and the extension buzzer 5 in accordance with the detection of the call, a lock release button 15 which operates to release the electric lock 3, an electric lock/interphone changeover circuit 16 which changes over the interior of the entrance door station 2 in accordance with the operation of the lock release button 15, a first voltage supply circuit 17 which outputs a supply voltage of DC 15V for standby and call states, a second voltage supply circuit 18 which outputs a supply voltage of DC 6V for the talk between the room master station 1 and the entrance door station 2, a master station side transmitter circuit 20, and a call/talk changeover circuit 19 which is connected to the master station side transmitter circuit 20 in accordance with the call from the entrance door station 2, thereby to permit the talk. Further, the room master station 1 includes a buzz volume control circuit 21 which controls the volume of the buzz, and a buzz silence indication circuit 22 which indicates a buzz silence state.

On the other hand, the entrance door station 2 has display portions (not shown) which display the names etc. of the inhabitants of the respective rooms, and the entrance door station includes a display portion illumination circuit 31 which facilitates the recognition of the display portions even during the nighttime, call buttons 32 which have depression portions in a number corresponding to the connected room master stations 1, an entrance door station side transmitter circuit 33 which serves for the talk with the room master station 1, a connection destination changeover circuit 34 which selects the room master station 1 corresponding to the depressed call button 32, and which permits the talk with the selected room master station 1 and an electric lock releasing operation, a talk/electric lock changeover circuit 35 which changes over the connection with the room master station 1 between the entrance door station side transmitter circuit 33 and the electric lock 3, and a talk control circuit 36 which turns ON the entrance door station side transmitter circuit 33 by the voltage of 6V fed from the second voltage supply circuit 18.

Next, the operation of the door station apparatus with the electric lock will be described. During standby, an AC voltage is fed from the power source unit 4 to the room master station 1 and is rectified by the rectification circuit 11, delivered to the first voltage supply circuit 17. Then, the first voltage supply circuit 17 outputs the DC voltage of 15V, which is fed to the relevant circuits of the entrance door station 2 through the room master station 1 as well as the corresponding transmission line 6b.

In this state, when any depression portion for calling the desired room master station 1 is depressed among the call buttons 32 provided in the entrance door station 2, the connection destination changeover circuit 34 connects the room master station 1 corresponding to the depressed call button 32 and the talk/electric lock changeover circuit 35. Thus, the room master station 1 is connected to the talk/electric lock changeover circuit 35, and a talking line is established between the room master station 1 and the entrance door station 2. Changing the predetermined amount of current which is greater than one in the standby state flows from the room master station 1 to the connection destination changeover circuit 34 by the above operation.

Then, the call detection circuit 12 of the room master station 1 senses the fact that the current which is fed from the room master station 1 to the entrance door station 2 has changed to reach the predetermined value, and it feeds the supply voltage from the first voltage supply circuit 17 to the buzz generation circuit 13, thereby to turn ON the buzz generation circuit 13. Thus, a buzzer sounding signal is outputted from the buzz generation circuit 13, and the buzzer 14 being sounding means emits buzz. Also, the buzzer sounding signal is outputted to the extension buzzer 5 being extension sounding means connected to the room master station 1, and buzz is emitted.

Further, the buzzer sounding signal of the buzz generation circuit 13 is transmitted to the entrance door station 2 through the call/talk changeover circuit 19 and the electric lock/interphone changeover circuit 16, and a call acknowledgment tone is emitted from the entrance door station side transmitter circuit 33 through the connection destination changeover circuit 34 and the talk/electric lock changeover circuit 35.

In this manner, the call of the entrance door station 2 can be reliably recognized in the room by being provided with the extension sounding means, while the call manipulation of the room master station can be confirmed at the entrance door station so as to give the visitor a sense of relief.

Subsequently, the inhabitant who has confirmed the buzz owing to the sounding of the buzzer 14 answers by taking up the handset (not shown) of the room master station 1. In accordance with this operation, the call/talk changeover circuit 19 of the room master station 1 is changed over to its talk side, and the voltage of 6V is fed to the entrance door station 2 from the second voltage supply circuit 18 being a talking power source. Upon sensing the voltage change from 15V to 6V, the talk control circuit 36 of the entrance door station 2 turns ON the entrance door station side transmitter circuit 33, thereby to permit the talk between the entrance door station 2 and the room master station 1.

A manipulation for releasing the electric lock 3 from the room master station 1 is effected by depressing the lock release button 15 of the room master station 1. Owing to the depressing manipulation of the lock release button 15, the electric lock/interphone changeover circuit 16 is switched, and the AC voltage fed from the power source unit 4 to the room master station 1 is fed to the entrance door station 2 as it is. Upon detecting the minus half wave of the fed AC voltage, the talk/electric lock changeover circuit 35 usually connected to the entrance door station side transmitter circuit 33 is switched and connected to the side of the electric lock 3. As a result, the AC voltage outputted from the power source unit 4 is directly applied to the electric lock 3, and the electric lock 3 operates to be released.

Figure 2:
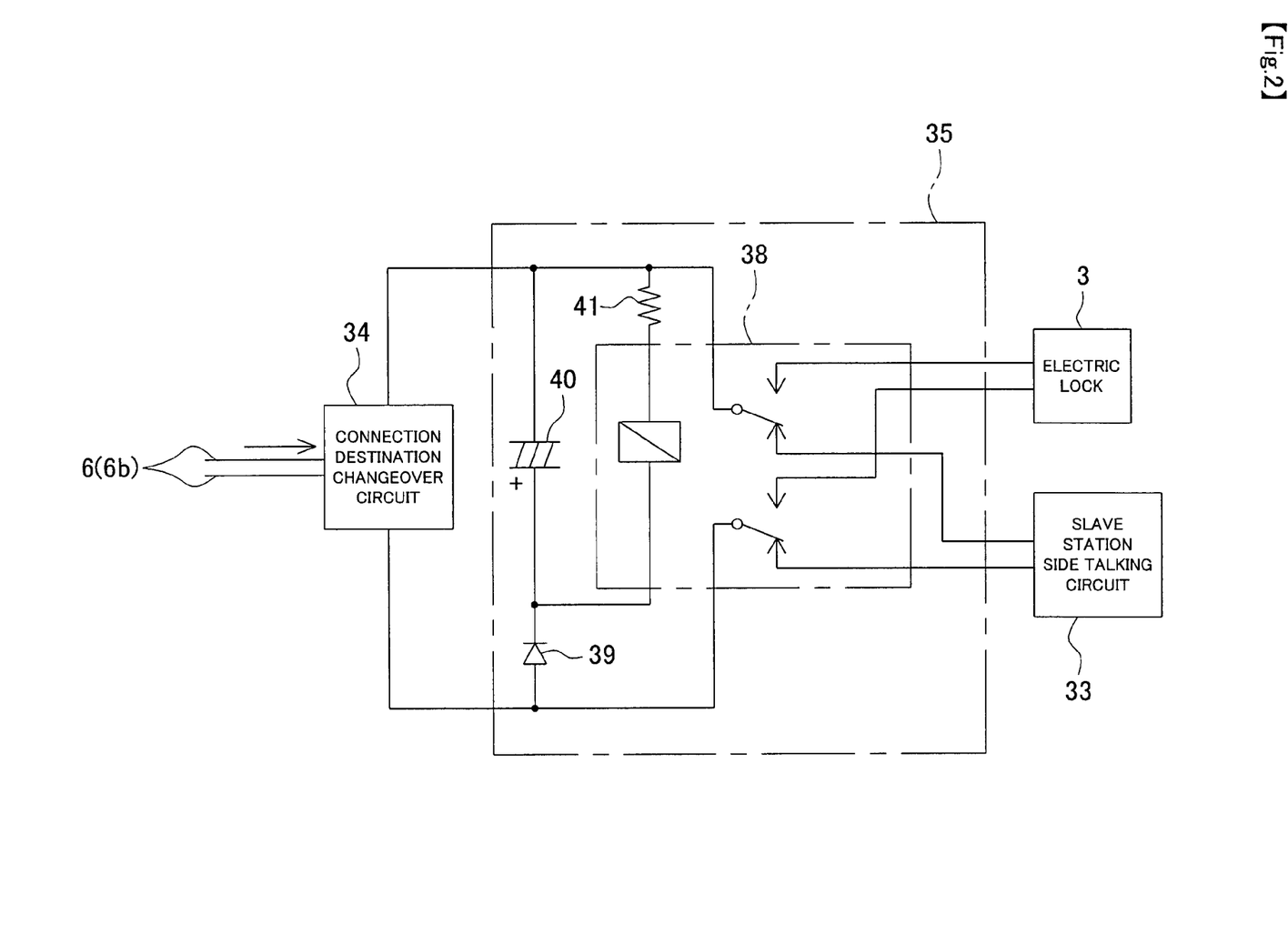
FIG. 2 is an explanatory diagram of a talk/electric lock changeover circuit.

Here, the operation of releasing the electric lock 3 will be described in detail with reference to the explanatory diagram of the talk/electric lock changeover circuit 35 in FIG. 2 and the explanatory diagrams of the operation of the circuit 35 in FIGS. 3A–3C. In FIG. 2, numeral 38 designates a two-circuit changeover relay, numeral 39 designates a rectifier diode, numeral 40 designates a smoothing capacitor, and numeral 41 designates a voltage-dividing resistor.

Figure 3A:
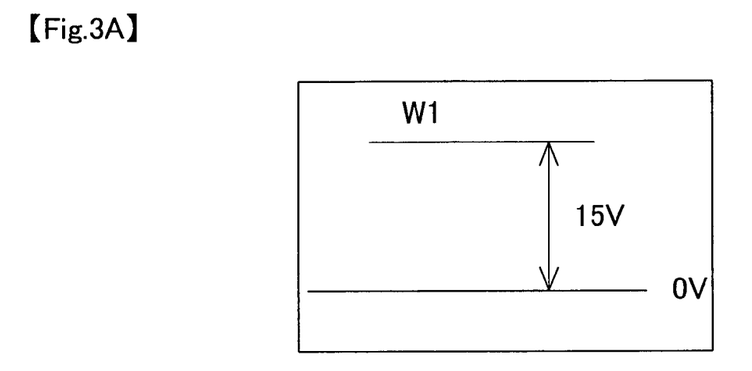

First, in the standby/call state, the DC voltage of 15V as shown at a waveform W1 in FIG. 3A is applied from the first voltage supply circuit 17 of the room master station 1 to the connection destination changeover circuit 34 of the entrance door station 2. In this state, any current is not caused to flow to the two-circuit changeover relay 38 by the rectifier diode 39, and the two-circuit changeover relay 38 is connected with the entrance door station side transmitter circuit 33.

Figure 3B:
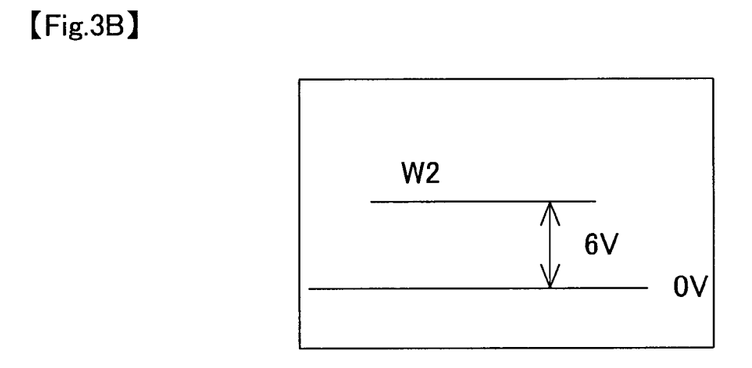
Figure 3C:
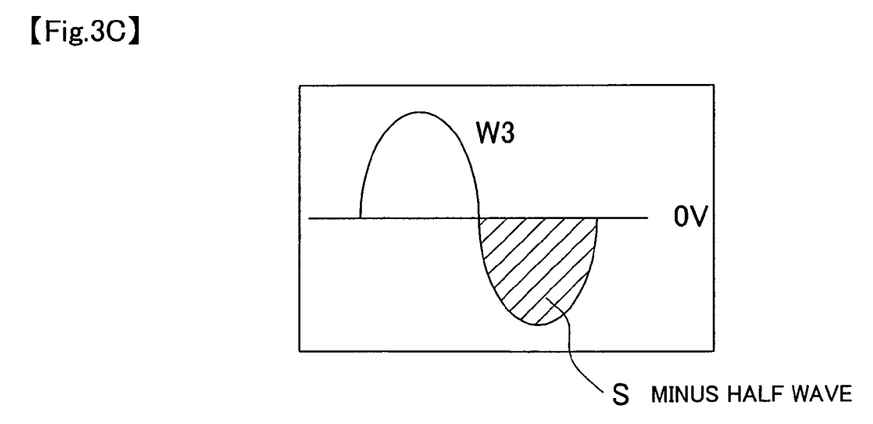

Subsequently, during the talk, the voltage of 6V shown at a waveform W2 in FIG. 3B is applied from the second voltage supply circuit 18 of the room master station 1 to the connection destination changeover circuit 34 of the entrance door station 2. Also in this state, any current is not caused to flow to the two-circuit changeover relay 38 by the rectifier diode 39 as in the standby/call state, and the two-circuit changeover relay 38 is kept connected with the entrance door station side transmitter circuit 33.

In the lock releasing state where the lock release button 15 of the room master station 1 has been depressed, the electric lock/interphone changeover circuit 16 is switched so as to feed the AC voltage from the power source unit 4 to the entrance door station 2. Thus, the application of the DC voltage is stopped, and the AC voltage from the power source unit 4 as shown at a waveform W3 in FIG. 3C is applied to the connection destination changeover circuit 34 of the entrance door station 2. The minus half wave of the AC voltage flows through the rectifier diode 39, and current is caused to flow through the two-circuit changeover relay 38 and the voltage-dividing resistor 41 by the smoothing capacitor 40. Then, the two-circuit changeover relay 38 operates to be switched to the side of the electric lock 3, and the electric lock 3 is released.

In this manner, the talk/electric lock changeover circuit which, when the AC voltage for releasing the electric lock is applied to the transmission line between the room master station and the entrance door station, detects the AC voltage to separate the entrance door station side transmitter circuit connected with the room master station, and to connect the electric lock connected through the transmission line with the room master station, is provided in the entrance door station. Therefore, the electric lock can be manipulated from the room master station, and the room master station and the electric lock need not be directly connected by a transmission line. Moreover, such an aspect can be performed merely by connecting the section between the room master station and the entrance door station by the transmission line of two-wire system. Furthermore, since the electric lock is driven by the AC voltage delivered from the room master station, an operating supply voltage is not separately required. Accordingly, wiring arrangements are facilitated, all the wiring lines can be laid with one sort of transmission lines of two-wire system, and an existing door station apparatus having no electric lock can be easily replaced with one having an electric lock.

The current of the operating power source as fed from the room master station to the entrance door station is changed by the call manipulation of the entrance door station, and the sounding means of the room master station buzzes by detecting the change. Therefore, a call signal need not be separately transmitted through a transmission line from the entrance door station, and the circuit arrangement can be simplified. Moreover, since the high voltage is set for the call manipulation, no malfunction occurs due to the fact that the circuits (for example, the connection destination changeover circuit 34) operating on the basis of the call manipulation of the entrance door station 2 are designed in conformity with high-voltage specifications, whereas the circuits operating during the talk are designed in conformity with low-voltage specifications. As a result, the entrance door station side circuits which require the high voltage can be used during the call manipulation.

Further, the supply voltages which are fed to the entrance door station for the standby/call operation and for the talk operation are changed, and the validity/invalidity of the entrance door station side transmitter circuit is controlled by utilizing the change as a switching signal. Therefore, a changeover signal need not be separately generated, and the circuit can be simplified.

In addition, since the talk/electric lock changeover circuit is operated by detecting the minus half wave of the AC voltage waveform, the changeover operation can be conducted instantly and reliably. Moreover, the circuit arrangement for detecting the minus half wave of the AC voltage waveform can be formed of, for example, a diode and a capacitor, which simplifies the circuit.

Figure 4:
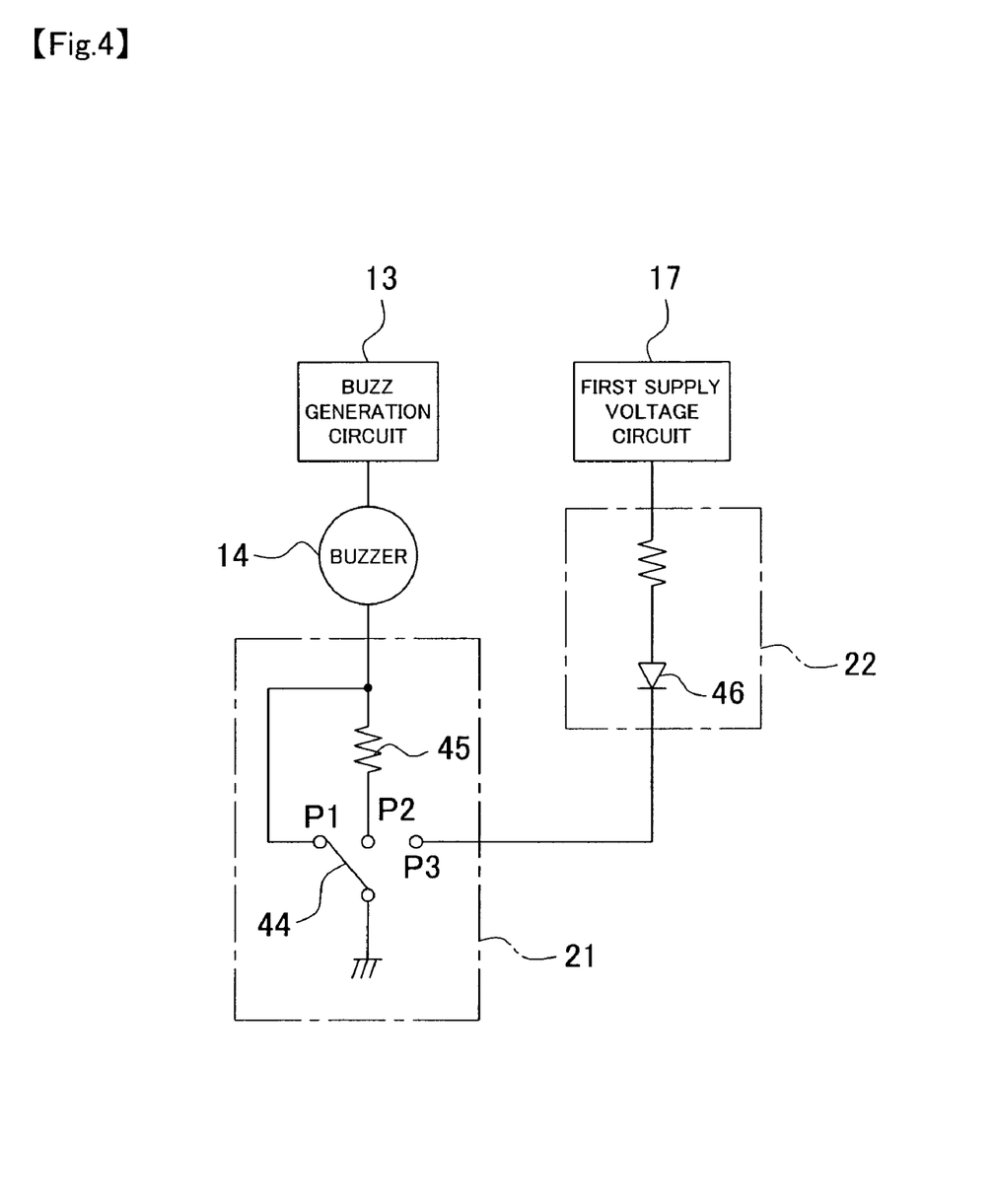
FIG. 4 is a circuit diagram of a buzz volume control circuit as well as a buzz silence indication circuit.

FIG. 4 exemplifies the buzz volume control circuit 21 and the buzz silence indication circuit 22 which are provided in the room master station 1. Referring to FIG. 4, numeral 44 designates a changeover switch, numeral 45 designates a resistor, and numeral 46 designates a light emitting diode. As shown in the figure, the buzz volume control circuit 21 is constructed so that a buzz volume can be set in the three stages of "large", "medium" and "null (silence)". A switch position P1 corresponds to the volume "large", a switch position P2 to the volume "medium" and a switch position P3 to the volume "null".

Besides, in a case where the volume "null" with which the buzz is not sounded is set by manipulating the buzz volume control circuit 21, the setting is notified to the inhabitant by the light emission of the light emitting diode 46 of the buzz silence indication circuit 22.

In this manner, the buzz volume can be adjusted according to the preference of the inhabitant, and forgetting the release of the buzzer can be prevented because the buzz silence setting is reported by the buzz silence indication circuit.

Besides, the display portion illumination circuit 31 provided in the entrance door station 2 in FIG. 1 includes backlighting structures (not shown) in a number corresponding to the display portions. Herein, the display portion illumination circuit 31 is constructed so that each individual backlighting structure may be lit up whenever it receives the electric power of any of the first voltage supply circuit 17, second voltage supply circuit 18 and power source unit 4 of the corresponding room master station 1.

In this manner, the display portion illumination circuit is provided in the entrance door station, and the backlighting structure is lit up by being fed with the power through the transmission line from the corresponding individual room master station. Therefore, the call button can be easily recognized even during the nighttime, and the display portion illumination circuit need not be separately furnished with power feed means. Moreover, since the corresponding backlighting structure is not lit up unless the room master station is fed with the power, the presence of a vacant room by way of example is easily recognized when the power fed to the room master station is cut off and the backlighting structure is not lit up.

Additionally, the backlighting structure may well be constructed so as to be lit up only while the power of the first voltage supply circuit 17 is fed. Even in this case, the visitor can easily recognize the display portion.

In addition, the two circuits which are first and second voltage supply circuits are provided in the embodiment, however, the two sorts of voltages may well be outputted by a single voltage supply circuit. Further, although the power source unit 4 is provided in every room master station 1, it is also allowed to employ a construction in which the supply voltage is fed from a single power source unit to the respective room master stations. The extension buzzer 5 may be provided at need.

Figure 5:
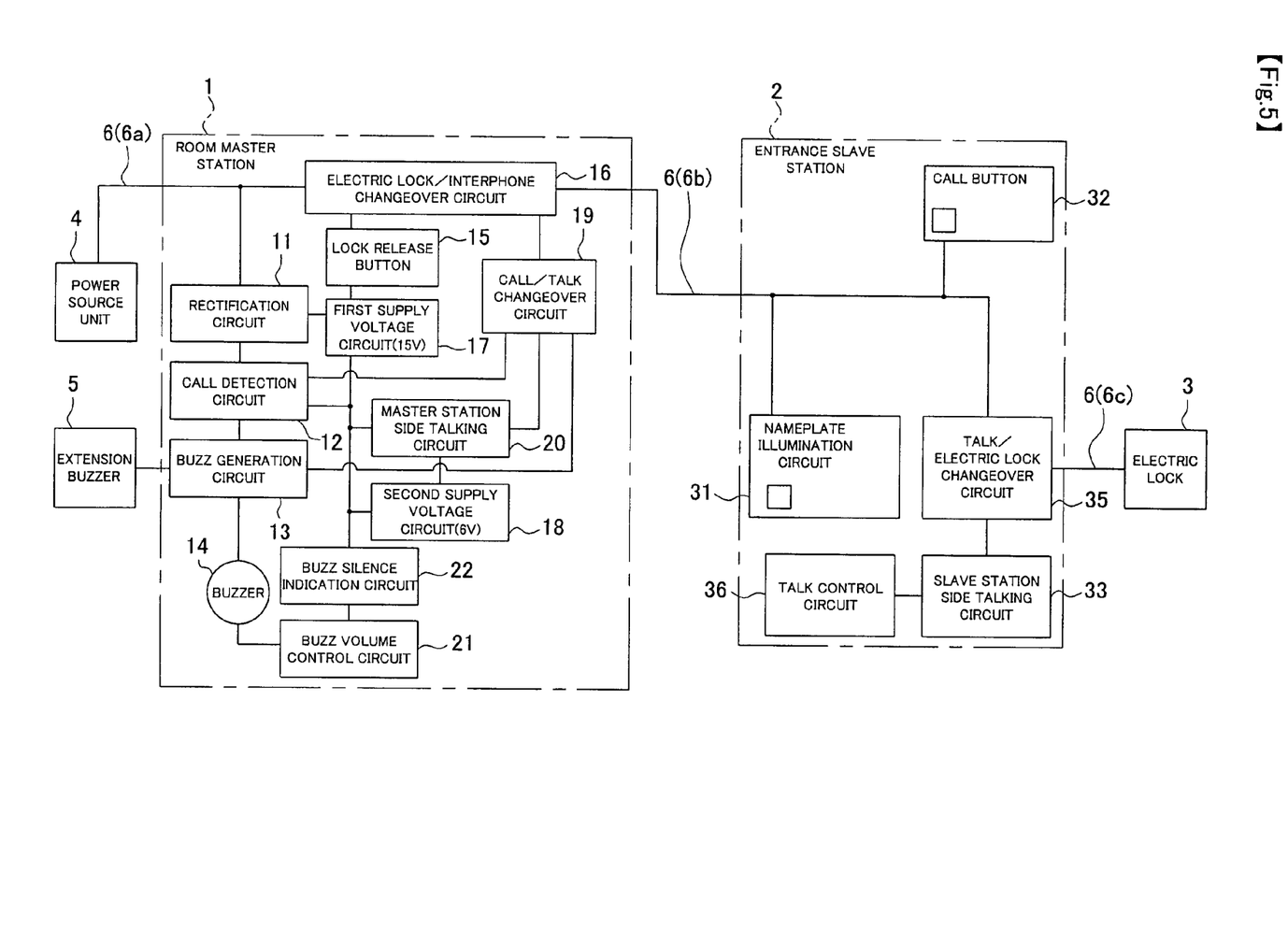
FIG. 5 is a block diagram showing another embodiment of the door station apparatus with an electric lock according to the present invention.

Further, the four room master stations are provided in the embodiment, only one room master station may well be connected to the entrance door station as shown in FIG. 5. In this case, the connection destination changeover circuit is not necessary, and it is sufficient to have a single call button.

As thus far described in detail, according to the present invention, it is permitted to manipulate an electric lock from a room master station and to favorably actuate a door station apparatus, merely by connecting only the respective sections between a power source unit and the room master station, between the room master station and an entrance door station, and between the entrance door station and the electric lock by transmission lines of two-wire system for transmitting signals and electric power. Accordingly, wiring arrangements are facilitated, all wiring lines can be laid with one sort of transmission lines of two-wire system, and an existing door station apparatus having no electric lock can be easily replaced with one having the electric lock.

What is claimed is:

1. A door station apparatus with an electric lock, having at least one room master station which is installed in a room in order to talk with a visitor, an entrance door station which is connected with the room master station and which serves to call and talk with an inhabitant, an electric lock which is connected to the entrance door station and which is mounted on a door or gate of an entrance, and a power source unit which feeds a supply voltage to the room master station comprising:

transmission lines of a two-wire system for transmitting signals and electric power, and for connecting respective sections between said power source unit and said room master station, between said room master station and said entrance door station, and between said entrance door station and said electric lock;

an entrance door station side transmitter circuit provided in said entrance door station for the talking with a visitor; and a talk/electric lock changeover circuit provided in said entrance door station, and which, when an AC voltage for a release operation of said electric lock is applied to the transmission line in the section between said room master station and said entrance door station, detects the AC voltage to separate said entrance door station side transmitter circuit connected to said room master station and to connect said electric lock connected thereto through the transmission line with said room master station;

whereby said electric lock connected to said entrance door station is permitted to be manipulated from said room master station through the transmission line.

2. A door station apparatus with an electric lock having at least one room master station which is installed in a room in order to talk with a visitor, an entrance door station which is connected with the room master station and which serves to call and talk with an inhabitant, an electric lock which is connected to the entrance door station and which is mounted on a door or gate of an entrance, and a power source unit which feeds a supply voltage to the room master station comprising:

transmission lines of a two-wire system for transmitting signals and electric power, and for connecting respective sections between said power source unit and said room master station, between said room master station and said entrance door station, and between said entrance door station and said electric lock;

an entrance door station side transmitter circuit provided in said entrance door station for the talking with a visitor; and a talk/electric lock changeover circuit provided in said entrance door station, and which, when an AC voltage for a release operation of said electric lock is applied to the transmission line in the section between said room master station and said entrance door station, detects the AC voltage to separate said entrance door station side transmitter circuit connected to said room master station and to connect said electric lock connected thereto through the transmission line with said room master station;

whereby said electric lock connected to said entrance door station is permitted to be manipulated from said room master station through the transmission line;

wherein the switching operation of said talk/electric lock changeover circuit is effected by detecting a minus half wave of the AC voltage.

3. A door station apparatus with an electric lock having at least one room master station which is installed in a room in order to talk with a visitor, an entrance door station which is connected with the room master station and which serves to call and talk with an inhabitant, an electric lock which is connected to the entrance door station and which is mounted on a door or gate of an entrance, and a power source unit which feeds a supply voltage to the room master station comprising:

transmission lines of a two-wire system for transmitting signals and electric power, and for connecting respective sections between said power source unit and said room master station, between said room master station and said entrance door station, and between said entrance door station and said electric lock;

an entrance door station side transmitter circuit provided in said entrance door station for the talking with a visitor; and a talk/electric lock changeover circuit provided in said entrance door station, and which, when an AC voltage for a release operation of said electric lock is applied to the transmission line in the section between said room master station and said entrance door station, detects the AC voltage to separate said entrance door station side transmitter circuit connected to said room master station and to connect said electric lock connected thereto through the transmission line with said room master station;

whereby said electric lock connected to said entrance door station is permitted to be manipulated from said room master station through the transmission line;

wherein said room master station includes a first voltage supply circuit for generating a DC voltage for performing a standby/call operation between said room master station and said entrance door station, and a second voltage supply circuit for generating a DC voltage for performing a talk operation between said room master station and said entrance door station, and the voltage generated by said first voltage supply circuit is higher than the voltage generated by said second voltage supply circuit.

4. The door station apparatus with an electric lock as defined in claim 2, wherein said room master station includes a first voltage supply circuit for generating a DC voltage for performing a standby/call operation between said room master station and said entrance door station, and a second voltage supply circuit for generating a DC voltage for performing a talk operation between said room master station and said entrance door station, and the voltage generated by said first voltage supply circuit is higher than the voltage generated by said second voltage supply circuit.

5. The door station apparatus with an electric lock as defined in claim 3, wherein said entrance door station includes a talk control circuit which invalidates said entrance door station side transmitter circuit in a case where the voltage from said first voltage supply circuit is applied to the transmission line laid between said room master station and said entrance door station, and which validates said entrance door station side transmitter circuit in a case where the voltage from said second voltage supply circuit for the talk is applied to the same.

6. The door station apparatus with an electric lock as defined in claim 4, wherein said entrance door station includes a talk control circuit which invalidate said entrance door station side transmitter circuit in a case where the voltage from said first voltage supply circuit is applied to the transmission line laid between said room master station and said entrance door station, and which validates said entrance door station side transmitter circuit in a case where the voltage from said second voltage supply circuit for the talk is applied to the same.

7. The door station apparatus with an electric lock as defined in claim 3, wherein:

said room master station includes a call detection circuit for detecting a call signal sent from said entrance door station, and a buzz generation circuit which generates a buzz signal; and said call detection circuit monitors current flowing from said room master station to said entrance door station in a state where the voltage from said first voltage supply circuit is applied to the transmission line in the section between said room master station and said entrance door station, and it feeds a supply voltage to said buzz generation circuit when the current flowing through said transmission line has reached a predetermined value during the call operation of said entrance door station.

8. The door station apparatus with an electric lock as defined in claim 4, wherein:

said room master station includes a call detection circuit for detecting a call signal sent from said entrance door station, and a buzz generation circuit which generates a buzz signal; and said call detection circuit monitors current flowing from said room master station to said entrance door station in a state where the voltage from said first voltage supply circuit is applied to the transmission line in the section between said room master station and said entrance door station, and it feeds a supply voltage to said buzz generation circuit when the current flowing through said transmission line has reached a predetermined value during the call operation of said entrance door station.

9. The door station apparatus with an electric lock as defined in claim 5, wherein:

said room master station includes a call detection circuit for detecting a call signal sent from said entrance door station, and a buzz generation circuit which generates a buzz signal; and said call detection circuit monitors current flowing from said room master station to said entrance door station in a state where the voltage from said first voltage supply circuit is applied to the transmission line in the section between said room master station and said entrance door station, and it feeds a supply voltage to said buzz generation circuit when the current flowing through said transmission line has reached a predetermined value during the call operation of said entrance door station.

10. The door station apparatus with an electric lock as defined in claim 6, wherein:

said room master station includes a call detection circuit for detecting a call signal sent from said entrance door station, and a buzz generation circuit which generates a buzz signal; and said call detection circuit monitors current flowing from said room master station to said entrance door station in a state where the voltage from said first voltage supply circuit is applied to the transmission line in the section between said room master station and said entrance door station, and it feeds a supply voltage to said buzz generation circuit when the current flowing through said transmission line has reached a predetermined value during the call operation of said entrance door station.

11. The door station apparatus with an electric lock as defined in claim 7, wherein said room master station includes sounding means with extension sounding means connected thereto, both the sounding means being sounded by the buzz signal generated by said buzz generation circuit, and the call signal is also sent to said entrance door station so as to emit a call acknowledgment tone from said entrance door station side transmitter circuit included in said entrance door station.

12. The door station apparatus with an electric lock as defined in claim 8, wherein said room master station includes sounding means with extension sounding means connected thereto, both the sounding means being sounded by the buzz signal generated by said buzz generation circuit, and the call signal is also sent to said entrance door station so as to emit a call acknowledgment tone from said entrance door station side transmitter circuit included in said entrance door station.

13. The door station apparatus with an electric lock as defined in claim 9, wherein said room master station includes sounding means with extension sounding means connected thereto, both the sounding means being sounded by the buzz signal generated by said buzz generation circuit, and the call signal is also sent to said entrance door station so as to emit a call acknowledgment tone from said entrance door station side transmitter circuit included in said entrance door station.

14. The door station apparatus with an electric lock as defined in claim 10, wherein said room master station includes sounding means with extension sounding means connected thereto, both the sounding means being sounded by the buzz signal generated by said buzz generation circuit, and the call signal is also sent to said entrance door station so as to emit a call acknowledgment tone from said entrance door station side transmitter circuit included in said entrance door station.

15. The door station apparatus with an electric lock as defined in claim 1, wherein said entrance door station includes call buttons for calling the room master stations, and display portions for displaying information of the inhabitants, said call buttons and said display portions being provided in correspondence with said room master stations connected to said entrance door station, and said display portions are furnished with a display portion illumination circuit for permitting recognition of the information even in the nighttime.

16. The door station apparatus with an electric lock as defined in claim 2, wherein said entrance door station includes call buttons for calling the room master stations, and display portions for displaying information of the inhabitants, said call buttons and said display portions being provided in correspondence with said room master stations connected to said entrance door station, and said display portions are furnished with a display portion illumination circuit for permitting recognition of the information even in the nighttime.

17. The door station apparatus with an electric lock as defined in claim 3, wherein said entrance door station includes call buttons for calling the room master stations, and display portions for displaying information of the inhabitants, said call buttons and said display portions being provided in correspondence with said room master stations connected to said entrance door station, and said display portions are furnished with a display portion illumination circuit for permitting recognition of the information even in the nighttime.

18. The door station apparatus with an electric lock as defined in claim 5, wherein said entrance door station includes call buttons for calling the room master stations, and display portions for displaying information of the inhabitants, said call buttons and said display portions being provided in correspondence with said room master stations connected to said entrance door station, and said display portions are furnished with a display portion illumination circuit for permitting recognition of the information even in the nighttime.

19. The door station apparatus with an electric lock as defined in claim 7, wherein said entrance door station includes call buttons for calling the room master stations, and display portions for displaying information of the inhabitants, said call buttons and said display portions being provided in correspondence with said room master stations connected to said entrance door station, and said display portions are furnished with a display portion illumination circuit for permitting recognition of the information even in the nighttime.

20. The door station apparatus with an electric lock as defined in claim 11, wherein said entrance door station includes call buttons for calling the room master stations, and display portions for displaying information of the inhabitants, said call buttons and said display portions being provided in correspondence with said room master stations connected to said entrance door station, and said display portions are furnished with a display portion illumination circuit for permitting recognition of the information even in the nighttime.

21. The door station apparatus with an electric lock as defined in claim 15, wherein said display portion illumination circuit includes backlighting structures in a number corresponding to said display portions, and each of the individual backlighting structures is illuminated by electric power fed from the corresponding room master station.

22. The door station apparatus with an electric lock as defined in claim 16, wherein said display portion illumination circuit includes backlighting structures in a number corresponding to said display portions, and each of the individual backlighting structures is illuminated by electric power fed from the corresponding room master station.

23. The door station apparatus with an electric lock as defined in claim 17, wherein said display portion illumination circuit includes backlighting structures in a number corresponding to said display portions, and each of the individual backlighting structures is illuminated by electric power fed from the corresponding room master station.

24. The door station apparatus with an electric lock as defined in claim 18, wherein said display portion illumination circuit includes backlighting structures in a number corresponding to said display portions, and each of the individual backlighting structures is illuminated by electric power fed from the corresponding room master station.

25. The door station apparatus with an electric lock as defined in claim 19, wherein said display portion illumination circuit includes backlighting structures in a number corresponding to said display portions, and each of the individual backlighting structures is illuminated by electric power fed from the corresponding room master station.

26. The door station apparatus with an electric lock as defined in claim 20, wherein said display portion illumination circuit includes backlighting structures in a number corresponding to said display portions, and each of the individual backlighting structures is illuminated by electric power fed from the corresponding room master station.

27. The door station apparatus with an electric lock as defined in claim 15, wherein said entrance door station includes a connection destination changeover circuit which, when any of said call buttons is depressed, selects said room master station corresponding to the depressed call button and permits talk with the selected room master station and the electric lock releasing manipulation therefrom.

28. The door station apparatus with an electric lock as defined in claim 21, wherein said entrance door station includes a connection destination changeover circuit which, when any of said call buttons is depressed, selects said room master station corresponding to the depressed call button and permits talk with the selected room master station and the electric lock releasing manipulation therefrom.

29. The door station apparatus with an electric lock as defined in claim 11, wherein said room master station includes a buzz volume control circuit for adjusting a buzz volume of said sounding means, and a buzz silence indication circuit which indicates a buzz silence setting when said buzz volume control circuit is set at a null buzz volume for preventing said sounding means from operating.

30. The door station apparatus with an electric lock as defined in claim 15, wherein said room master station includes a buzz volume control circuit for adjusting a buzz volume of said sounding means, and a buzz silence indication circuit which indicates a buzz silence setting when said buzz volume control circuit is set at a null buzz volume for preventing said sounding means from operating.

31. The door station apparatus with an electric lock as defined in claim 21, wherein said room master station includes a buzz volume control circuit for adjusting a buzz volume of said sounding means, and a buzz silence indication which indicates a buzz silence setting when said buzz volume control circuit is set at a null buzz volume for preventing said sounding means from operating.

32. The door station apparatus with an electric lock as defined in claim 27, wherein said room master station includes a buzz volume control circuit for adjusting a buzz volume of said sounding means, and a buzz silence indication circuit which indicates a buzz silence setting when said buzz volume control circuit is set at a null buzz volume for preventing said sounding means from operating.

\* \* \* \* \*